(12) United States Patent
Bozio et al.

(10) Patent No.: US 9,457,697 B2
(45) Date of Patent: Oct. 4, 2016

(54) ADJUSTABLE VEHICLE ARMREST AND TAMBOUR DOOR

(71) Applicant: Johnson Controls Technology Company, Holland, MI (US)

(72) Inventors: Ronald A. Bozio, Holland, MI (US); Scott A. Hansen, Holland, MI (US); Craig D. Flowerday, Holland, MI (US); Jason M. Hipshier, Hudsonville, MI (US)

( * ) Notice: Subject to any disclaimer, the term of this patent is extended or adjusted under 35 U.S.C. 154(b) by 0 days.

(21) Appl. No.: 14/414,605

(22) PCT Filed: Jul. 12, 2013

(86) PCT No.: PCT/US2013/050320
§ 371 (c)(1),
(2) Date: Jan. 13, 2015

(87) PCT Pub. No.: WO2014/012021
PCT Pub. Date: Jan. 16, 2014

(65) Prior Publication Data
US 2015/0151656 A1    Jun. 4, 2015

Related U.S. Application Data

(60) Provisional application No. 61/671,376, filed on Jul. 13, 2012.

(51) Int. Cl.
*B60N 2/46* (2006.01)
*B60R 7/04* (2006.01)

(52) U.S. Cl.
CPC ............ *B60N 2/4646* (2013.01); *B60N 2/4686* (2013.01); *B60R 7/04* (2013.01)

(58) Field of Classification Search
CPC ...... B60N 2/4646; B60N 2/4686; B60R 7/04
USPC ............ 296/24.34, 37.8, 37.15, 1.09
See application file for complete search history.

(56) References Cited

U.S. PATENT DOCUMENTS

| | | | | |
|---|---|---|---|---|
| 9,085,265 | B2* | 7/2015 | Hipshier | B29C 44/086 |
| 9,193,299 | B2* | 11/2015 | Kodama | B60Q 3/0243 |
| 2003/0155786 | A1 | 8/2003 | Kim et al. | |
| 2004/0080173 | A1 | 4/2004 | Niwa et al. | |
| 2009/0072568 | A1* | 3/2009 | Luginbill | B60R 7/04 296/37.8 |
| 2011/0115246 | A1* | 5/2011 | Beyer | B60N 2/4646 296/24.34 |
| 2011/0121596 | A1* | 5/2011 | Beyer | B60N 2/468 296/24.34 |
| 2011/0241371 | A1* | 10/2011 | Hipshier | B60Q 3/022 296/24.3 |

FOREIGN PATENT DOCUMENTS

| | | |
|---|---|---|
| EP | 1454789 | 9/2004 |
| WO | 2008064210 | 5/2008 |

OTHER PUBLICATIONS

PCT International Search Report and Written Opinion dated Dec. 11, 2013.

* cited by examiner

*Primary Examiner* — Jason S Morrow

(57) ABSTRACT

A vehicle armrest is designed to allow for sliding movement between retracted and extended positions as desired by the vehicle occupant. A tambour door is disposed over at least part of the armrest, and may be moved fore and aft to allow access to storage volumes within the armrest or a support structure. The armrest is supported by sliding structures, such as engaged rails, and the tambour door is supported by tracks, one of which is fixed or stationary, and the other of which moves with the armrest. In this manner, the tambour door may be fully supported as it moves fore and aft, whether the armrest is in the retracted or extended position.

20 Claims, 6 Drawing Sheets

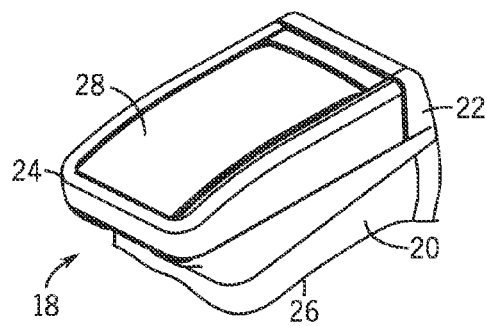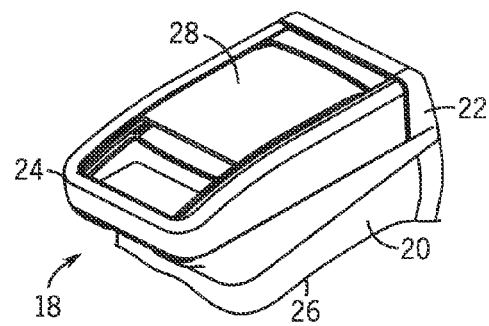
FIG. 2    FIG. 2A
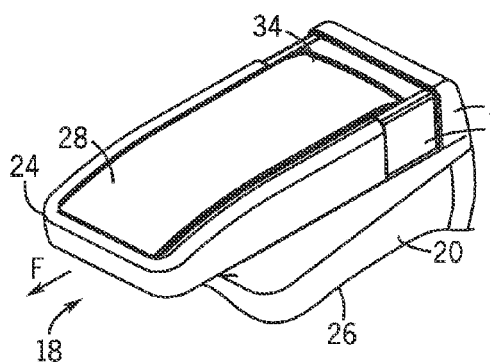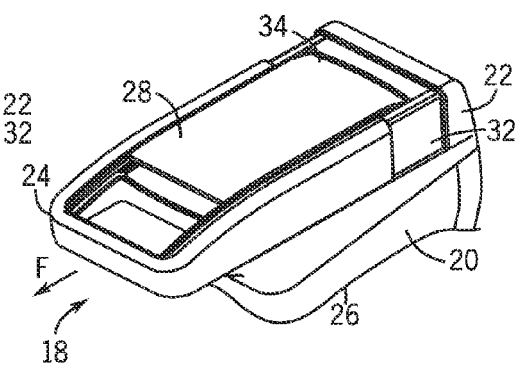
FIG. 3    FIG. 3A

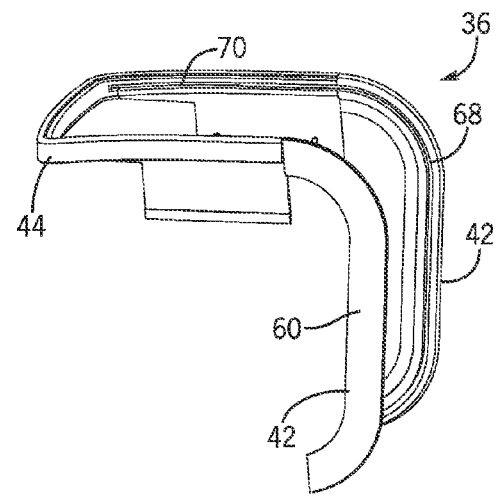
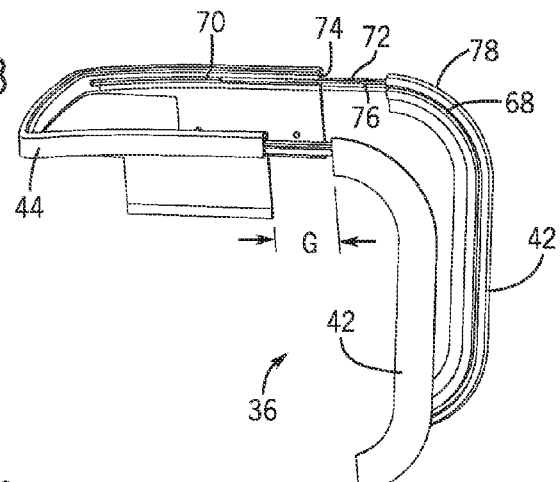
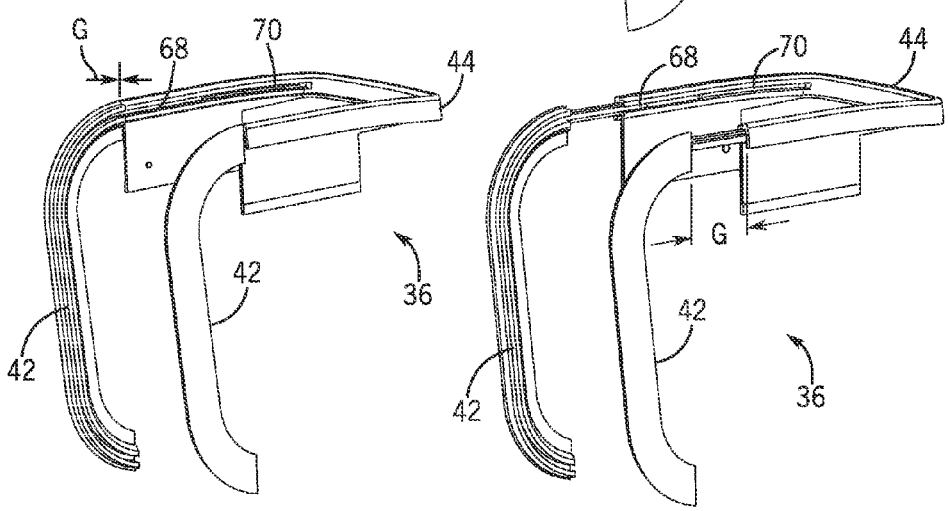

ADJUSTABLE VEHICLE ARMREST AND TAMBOUR DOOR

CROSS REFERENCE TO RELATED APPLICATIONS

This application is a national stage of PCT Application No. PCT/US2013/050320, entitled "ADJUSTABLE VEHICLE ARMREST AND TAMBOUR DOOR", filed on Jul. 12, 2013, which claims priority from and the benefit of U.S. Provisional Patent Application No. 61/671,376, entitled "ADJUSTABLE VEHICLE ARM REST AND TAMBOUR DOOR", filed on Jul. 13, 2012. Each of the listed applications is incorporated by reference in its entirety.

BACKGROUND

The invention relates generally to vehicle interior components, and more particularly to an adjustable console armrest with a tambour door.

Over recent years, many different vehicle consoles in armrests have been developed, particularly for use in cars and trucks. Many of these are designed to be placed between front vehicle seats, although some are placed in other locations, such as between rear seats. Such consoles often provide for storage of various articles and may conveniently offer functionality as a cushioned armrest. More recent developments in the area include the ability to adjust or slide an armrest to a comfortable position. In such sliding armrests, one or more parts of the armrest may be slid forward or aft as desired by the vehicle occupant.

Certain consoles and armrests also include devices and structures intended to cover the interior storage volumes when access to them is not required. Such structures may comprise various types of doors that are hinged or slidably mounted on the console or armrest. One popular type of door is sometimes referred to as a tambour door. Tambour doors are typically constructed so that they can be slid back and forth, often sliding into a concealed space when opened to reveal the storage volumes of the console or armrest.

To date, however, no real attempt has been made to unite these types of developments. There is a need in the art, therefore, for innovative solutions to providing armrest functionality and covers, such as tambour doors, in arrangements that can be adjusted for the convenience of the vehicle occupants.

SUMMARY

The invention provides a novel armrest and tambour door assembly designed to respond to such needs. In accordance with certain aspects, a vehicle armrest system is provided that includes a support structure, and an armrest slidingly supported by the support structure and slidable between a retracted position and an extended position. A tambour door slidingly disposed with respect to the armrest and slidable between opened and closed positions in both the retracted position and the extended position of the armrest.

DRAWINGS

These and other features, aspects, and advantages of the present invention will become better understood when the following detailed description is read with reference to the accompanying drawings in which like characters represent like parts throughout the drawings, wherein:

FIG. 2 is a perspective view of an exemplary armrest in a retracted position;

FIG. 2A is a perspective view of the armrest of FIG. 2, in which a tambour door is in a partially opened position;

FIG. 3 is a similar perspective view of the armrest of FIG. 2 in an extended position;

FIG. 3A is a perspective view of the armrest of FIG. 3, in which the tambour door is in a partially opened position;

FIGS. 12A-13B are perspective views of components of an alternative arrangement for providing movement in the armrest.

DETAILED DESCRIPTION

Figure 1:
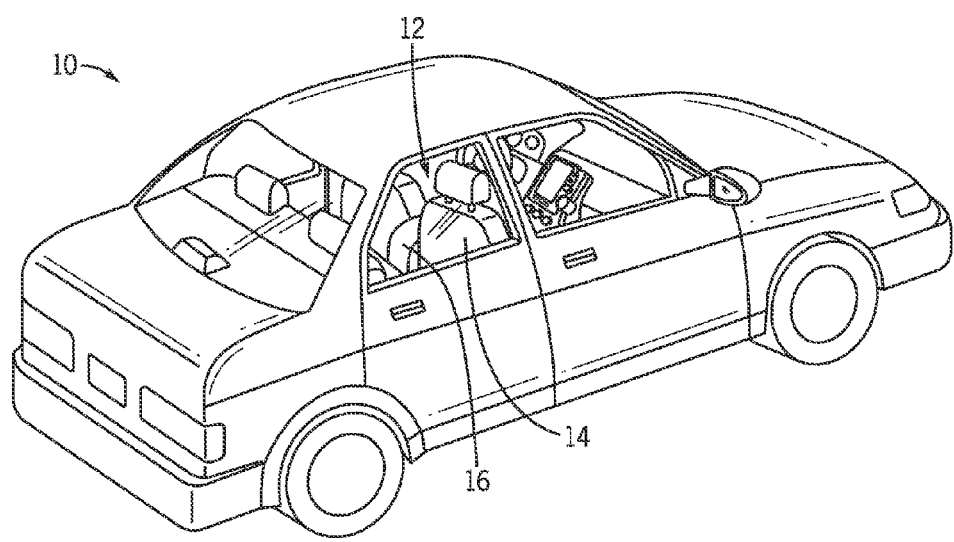
FIG. 1 is a perspective view of an exemplary vehicle incorporating an adjustable armrest in accordance with aspects of the present invention.

Turning now to the drawings, FIG. 1 illustrates an exemplary vehicle 10 of the type in which the invention may be deployed. The vehicle, in this case a car, has an interior volume 12 in which various interior components are situated, such as seats 14 and a center console 16. The center console supports an armrest that is designed to be adjustably extendable and retractable for the convenience of the vehicle occupants. The armrest allows for access into one or more interior storage volumes by manipulation of a tambour door. Similarly, opening of the tambour door may expose and render accessible one or more of various electronic devices, charging ports (e.g., for mobile telephones), wireless power surfaces, switches, and so forth. As illustrated, the console is positioned between forward seats of the vehicle, although armrests, tambour doors, and indeed entire consoles may be adapted for positioning in rear seats, in various positions within trucks, busses, aircraft, boats, and any other suitable vehicles.

As shown in FIG. 2, an armrest system 18 supported by the console generally comprises a support structure 20 on which the armrest itself is disposed. The support structure, according to an exemplary embodiment, may be part of the console, or a sub-assembly may be formed and this may be secured to the console during final assembly. A stationary portion 22 of the armrest system does not move with respect to the support structure 20, while a movable portion 24 is designed to allow the armrest to be extended and retracted. The movable portion 24 is shown, in FIG. 2, in its retracted position. In general, the movable portion 24 may be thought of as the actual armrest, while the overall support structure may be thought of as comprising the stationary portion 22 and some sort of base 26. Here again, this base may comprise all or a portion of a console that is designed to be secured to the vehicle floorboard, or to a seat structure, or any other internal securement point. As also shown in FIG. 2, a tambour door 28 is disposed over at least a part of the movable portion 24. The tambour door 28 may be opened and closed by sliding. For example, as shown in FIG. 2A, the tambour door 28 is in a partially open position, exposing a storage volume. When the tambour door 28 is opened, the tambour door is at least partially hidden within the support structure, passing through or into the stationary portion 22. In the retracted position of the armrest system, the rear portion of the tambour door is hidden within the stationary portion 22 of the armrest, or within the base 26, or both.

FIG. 3 is a perspective view of the armrest of FIG. 2 in an extended position, and FIG. 3A is a perspective view of the armrest of FIG. 3, in which the tambour door 28 is in a partially opened position. Simply by pulling the movable portion 24 of the armrest system 18, this portion may be caused to advance, thereby changing the position at which the vehicle occupant may rest his or her arm on the structure. This movement to the extended position is indicated by arrow F in FIG. 3. When the movable portion 24, according to this exemplary embodiment, is advanced to its extended position, spaces exposed between the stationary portion 22 and the rear edge of the movable portion 24 are covered by closeout panels 32. Here the rear portion 34 of the tambour door may be seen, exposed from the stationary portion 22 of the system by extension with the movable portion 24.

It should be noted that the particular arrangement illustrated in the figures and described herein is intended to be exemplary only. For example, according to this exemplary embodiment, a central tambour door is provided between or within frame-like sides or edges of the armrest. In variations of the new armrest system, the tambour door may not extend as far forward as in the illustrations, or may cover only a portion of the armrest. Similarly, the tambour door may fit under concealing portions of the armrest elements, where desired. Still further, the armrest itself, or any or all of the components illustrated may be padded to provide added comfort. In general, the components illustrated may be made of an injection moldable plastic material which may be assembled in any suitable conventional manner, such as via fasteners, adhesives, welding, and so forth. It should also be noted that the tambour door itself, which according to an exemplary embodiment forms part of the armrest, may provide a surface that serves as an armrest. For such configurations, the material and construction of the tambour door may provide a comfortable (e.g., cushioned) surface on which the vehicle occupant may rest an arm. In many instances, where the structure is provided between seats, two different occupants on either side of the assembly may rest arms on the tambour door itself.

Figure 4:
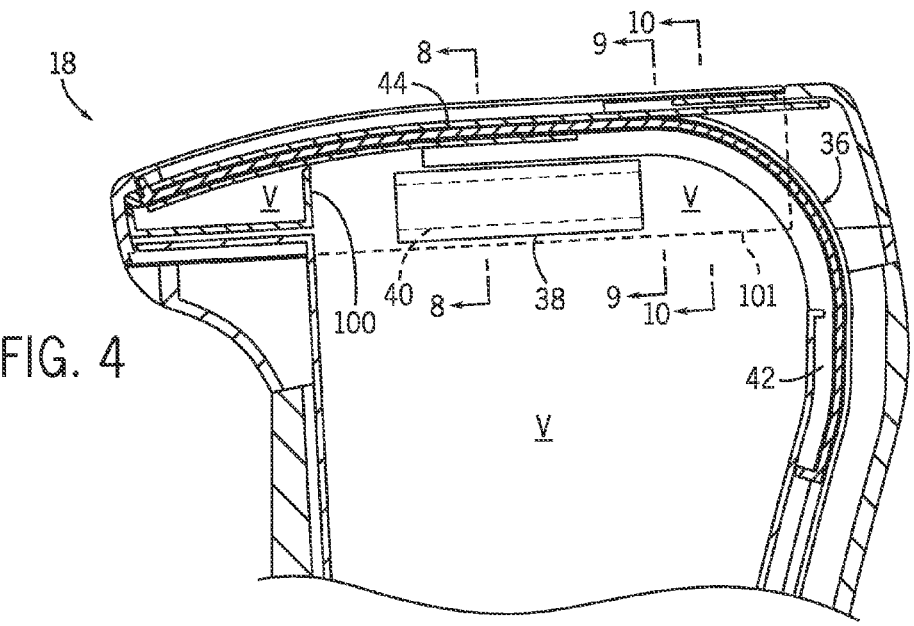
FIGS. 4 and 5 are exemplary sectional views through the structures shown in FIGS. 2 and 3 illustrating, respectively, retracted and extended positions of certain of the internal mechanical components.
Figure 5:
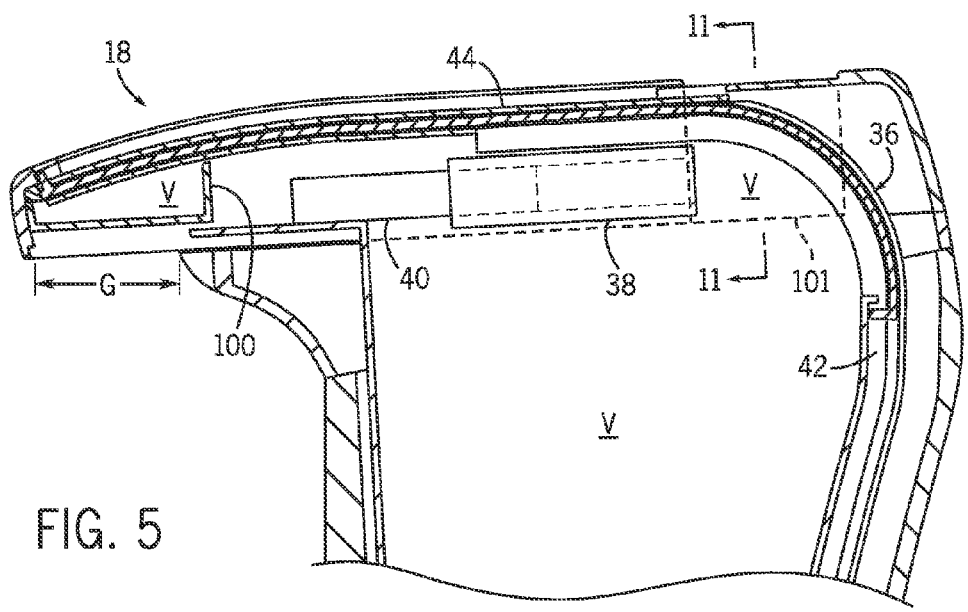

FIGS. 4 and 5 illustrate certain internal components of the new armrest and tambour door system both in retracted (FIG. 4) and extended (FIG. 5) positions. The armrest system 18 may be disposed in a center console or similar structure as illustrated generally in section in FIGS. 4 and 5. Structures are provided to support both the armrest, particularly the movable portion thereof and the tambour door, while allowing sliding motion of the armrest and tambour door together or separately. That is, in practice, the tambour door may be releasably fastened to the armrest, such as in a forward position by mechanically engaging detents, magnets, or any other suitable structure. Thus, as the armrest is slid forward and aft, the tambour door will follow the movable portion of the armrest, although the operator may at any time urge the tambour door rearwardly independently of the armrest to expose storage volumes V and so forth. Opening the tambour door may expose and render accessible one or more of various electronic devices, charging ports (e.g., for mobile telephones), wireless power surfaces, switches, and so forth (e.g., positioned within a storage volume V of a first compartment 100 and/or a storage volume V of a second compartment 101).

The support structures illustrated in FIGS. 4 and 5 may be generally thought of as an overall slide assembly 36 that serves to support both the armrest and the tambour door. As illustrated in FIG. 4, a stationary rail 38 is fixedly secured to the support structure, while a sliding rail 40 (see FIG. 5) is engaged in the profile of the stationary rail and can move freely between the retracted position in which it is hidden at least partially within the stationary rail (see FIG. 4) and the extended position (e.g., extended by a distance G), in which the sliding rail 40 extends from but is still supported by the stationary rail (see FIG. 5). The sliding rail 40 supports the armrest.

Tracks are then provided to support the tambour door. According to an exemplary embodiment, a stationary track 42 remains in place in the support structure and extends rearwardly from the slidable armrest into the support structure, such at some non-zero angle, generally vertically with a smooth bend to accommodate the tambour door movement. A sliding or movable track 44 is provided that is contiguous with the stationary track 42 and allows for sliding support of the tambour door both in the retracted position of FIG. 4 and the extended position of FIG. 5. This sliding or movable track 44 is also supported by the sliding rail 40 such that the tambour door is supported indirectly by the support structure through the intermediary of the sliding rail 40 and stationary rail 38.

Figure 6:
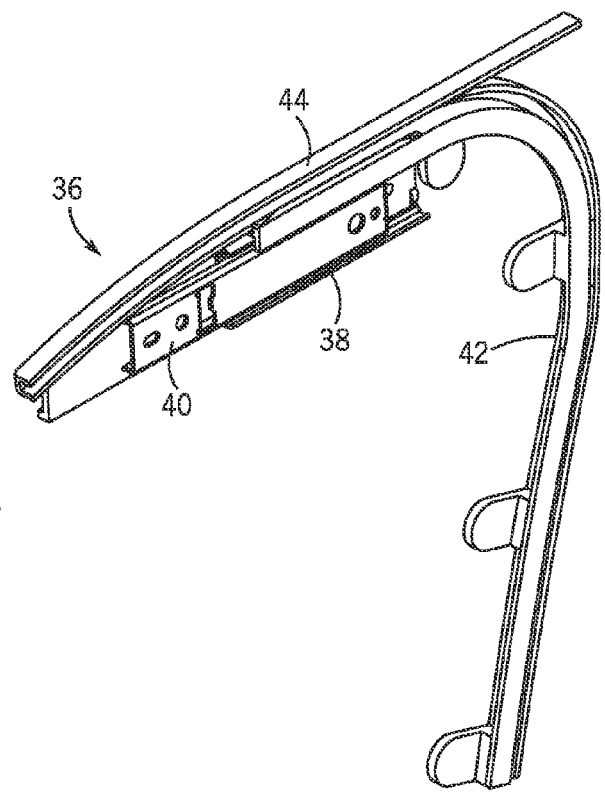
FIG. 6 is perspective view of certain of the same mechanical components, in particular slide components and tracks used to support the armrest and a tambour door, shown in the retracted position.
Figure 7:
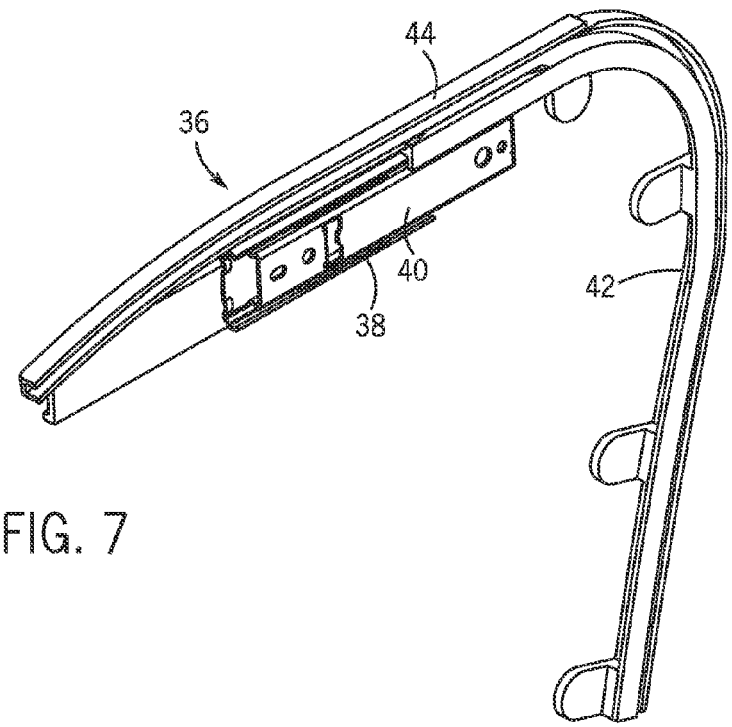
FIG. 7 is a similar perspective view of the same components in the extended position.
Figure 8:
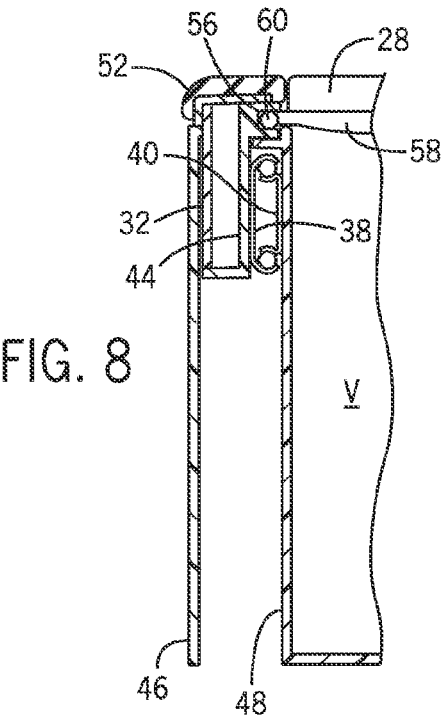
FIGS. 8-11 are sectional views through the same armrest at locations indicated in FIGS. 4 and 5 showing the relative position of the various assembly components.

FIGS. 6 and 7 are perspective views of the slide assembly described above. Here again, the stationary rail 38 is illustrated as it would be secured to a wall of the support structure. The sliding rail 40 is engaged with the stationary rail, these components having complimentary profiles and bearing components disposed therebetween. The sliding rail 40 will be secured to the armrest and allow the armrest to be retracted in advance.

Also shown in these figures is the track structure. In particular, the stationary track 42 is shown as supported by the stationary rail 38. This stationary track has a smooth bend to guide the tambour door as it is urged rearwardly into the support structure (e.g., the console). A sliding or movable track 44, on the other hand, is supported by the sliding rail 40 and is advanced and retracted with the sliding rail to provide continuous support of the tambour door. Each of the track structures forms a channel in which the tambour door is received and supported.

FIGS. 8-11 are partial sectional views of the structure described above, taking along lines illustrated in FIGS. 4 and 5. The section of FIG. 8, for example, illustrates the sliding track and rails forward the point where the sliding track and stationary track join. In the sectional view of FIG. 8, the support structure is shown as including an outer wall 46 and an inner wall 48 with the slide assembly disposed therebetween. In practice, a typical console may have symmetrical sides of similar constructions, each having inner and outer walls and similar mirror-image slide assemblies. Various asymmetries in these structures could, of course, be designed. Within the interior wall 48 at least one storage volume V is defined. Multiple such volumes may be defined such that various articles that could be conveniently stored within the support structure or console. According to an exemplary embodiment, the tambour door 28 is supported above this volume by the slide assembly. According to an exemplary embodiment, a corner piece 52 is provided. According to an exemplary embodiment, such corner pieces may extend partially or fully across the armrest and may at least partially cover the tambour door, where desired.

Although not separately shown in the figure, as noted, various user conveniences may be accessible upon movement of the tambour door. These may include, for example, various electronic devices, charging ports (e.g., for mobile telephones), wireless power surfaces, switches, and so forth.

According to an exemplary embodiment, a ledge extends from the inner wall 48 toward the outer wall. The sliding track 44 interfaces with this ledge, the sliding track itself being supported by the sliding rail 40. The ledge aids to support the upper extremity of the sliding track. Sliding track forms a channel 56 that receives and supports the tambour door. According to an exemplary embodiment, the tambour door comprises a series of ribs 58 over which a cushioned finishing material is secured. The ribs terminate in bearings, such as small balls 60 that are received within the channel 56. As the tambour door is displaced, then, these bearings move fore and aft within the channel 56. It should also be noted that this entire structure may be slid fore and aft by movement of the sliding track 44 with the sliding rail 40.

Figure 9:
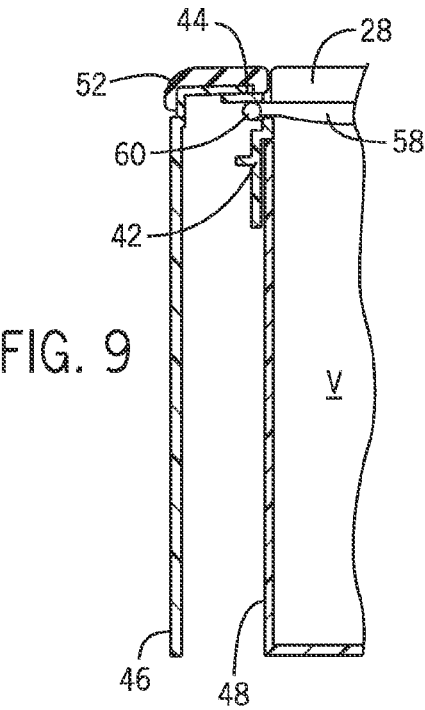
Figure 10:
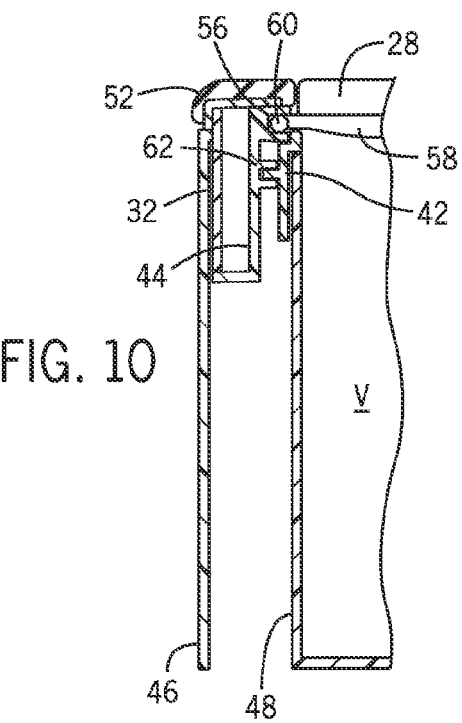
Figure 11:
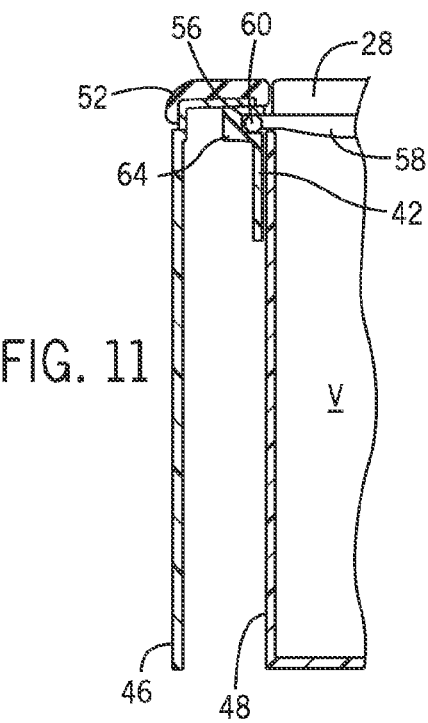

FIG. 9 illustrates the assembly at a more aft position. In this illustration, a portion of the door track is shown above the bearing 60 that aids in supporting the tambour door against escape in a vertical direction. Here the stationary track 42 becomes visible. The stationary track is at least partially supported, according to an exemplary embodiment, by the inner wall 48. FIG. 10 illustrates the same structure at a still further aft position. Here the stationary track 42 is visible along with the sliding track 44. These two will be interfaced with one another by a channel 62 formed in the sliding track 44. Also visible in FIG. 10 is the closeout panel 32 that covers the space between the stationary and movable portions of the armrest system as the movable portion is moved outwardly to its extended position. Finally, FIG. 11 illustrates the aft portion of the assembly when the armrest is in its extended position. Here only the stationary track 42 is visible, the sliding track having been advanced by movement of the armrest. A channel 64 is visible in this stationary track to support the aft portion of the tambour door. The channels 56 and 64, however, support the tambour door fully along its length in all of the positions of the armrest and tambour door. That is, the tambour door remains fully supported in both the retracted and extended positions of the armrest and in the opened and closed positions of the tambour door whether the armrest is extended or retracted.

Various alternative support and sliding structures may be envisioned for the new armrest and tambour door arrangement contemplated. For example, FIGS. 12A-13B illustrate a split track design for allowing extension and retraction of the armrest while supporting the tambour door in both positions (and positions between these). According to an exemplary embodiment, the slide assembly again forms part of the support structure. The (normally rearward) stationary track 42 again interfaces with the (normally forward) sliding or movable track 44. (Note that the "forward" and "rearward" positions of these tracks could, of course, be reversed.) A molded-in side panel is included in the stationary track to facilitate mounting. Also note that the slide assembly has been removed for clarity, as has the tambour door. According to an exemplary embodiment, the stationary track has a groove 68 in which the tambour door will ride when assembled. The groove 68 aligns with a similar groove 70 formed in the sliding or movable track 44. FIG. 12B shows this configuration in the extended position. Here, an extension finger 72 can be seen that extends between the stationary track 42 and the sliding or movable track 44. According to an exemplary embodiment, the extension finger is integral with, and molded as part of the stationary track, although other arrangements and assemblies may be used. The extension finger 72 includes surfaces that aid in supporting the tambour door for sliding between open and closed positions when the structure is in the extended position. Accordingly, the sliding or movable track 70 has support grooves 74 that aid in supporting the extension finger 72. The finger itself has an inner groove 76 that provides the desired support for the tambour door. This arrangement allows for a more rounded rear corner 78 than the previous arrangement described above. The overall structure allow for extension by a distance G, generally dependent upon the length of the tracks and the extension finger. FIG. 13A shows the same structure again in the retracted position from an opposite side from that shown in FIG. 12A, and FIG. 13B shows the same structure in the extended position from an opposite side from that shown in FIG. 12B.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A vehicle armrest system comprising:
   a support structure;
   an armrest slidingly supported by the support structure and slidable between a retracted position and an extended position; and
   a tambour door slidingly disposed with respect to the armrest and slidable between opened and closed positions in both the retracted position and the extended position of the armrest;
   wherein the support structure comprises an inner wall and an outer wall, and wherein the armrest and the tambour door are supported by slide assemblies disposed between the inner and outer walls.

2. The system of claim 1 wherein the support structure comprises a vehicle console.

3. The system of claim 1 wherein the vehicle console comprises an interior storage volume or electronic control or access point accessible when the tambour door is slid to the opened position in both the retracted position and the extended position of the armrest.

4. The system of claim 1 wherein the tambour door comprises an extension that is stored in at least one of the support structure and the armrest when the armrest is in the retracted position.

5. The system claim 1 wherein the slide assemblies comprise a track in which the tambour door is slidingly supported.

6. The system of claim 5 wherein the track comprises a stationary part and a movable part.

7. The system of claim 6 wherein the stationary part comprises an extension finger that extends partially into the movable part to aid in guiding the tambour door in the extended position.

8. The system of claim 6 wherein the movable part is supported on a movable slide of the armrest.

9. The system of claim 1 wherein the tambour door comprises an armrest surface.

10. A vehicle armrest system comprising:
    a support structure comprising nesting tracks;
    an armrest slidingly supported by the support structure and slidable between a retracted position and an extended position; and a tambour door slidingly disposed in the nesting tracks and slidable with respect to the armrest between opened and closed positions in both the retracted position and the extended position of the armrest.

11. The system of claim 10 wherein the nesting tracks comprise a stationary track and a movable track that interfaces with the stationary track to provide support for sliding of the tambour door in both the retracted and extended positions of the armrest.

12. The system of claim 11 wherein the stationary track comprises an extension finger that extends from the stationary track to the movable track and is at least partially supported by the movable track.

13. The system of claim 12 wherein the extension finger is integrally molded with the stationary track.

14. The system of claim 10 wherein the tambour door comprises an armrest surface.

15. The system of claim 10 wherein the support structure comprises a vehicle console.

16. The system of claim 10 wherein the vehicle console comprises an interior storage volume or electronic control or access point accessible when the tambour door is slid to the opened position in both the retracted position and the extended position of the armrest.

17. The system of claim 10 wherein the stationary track comprises a rounded rear corner.

18. A vehicle armrest system comprising:
a vehicle console support structure;
nesting tracks comprising a stationary track and a movable track in sliding engagement;
an armrest slidingly supported by the support structure and slidable between a retracted position and an extended position; and
a tambour door slidingly disposed in the nesting tracks and slidable with respect to the armrest between opened and closed positions in both the retracted position and the extended position of the armrest, the stationary track and the movable track comprising grooves that provide support for the tambour door as it is slid between the opened and closed positions.

19. The system of claim 18 wherein the stationary track comprises an integral extension finger that at least partially supports the tambour door in the extended position of the armrest.

20. A vehicle armrest system comprising:
a support structure;
an armrest slidingly supported by the support structure and slidable between a retracted position and an extended position;
a tambour door slidingly disposed with respect to the armrest and slidable between opened and closed positions in both the retracted position and the extended position of the armrest;
the armrest comprising a first portion and a second portion;
wherein the second portion is configured to increase the length of the armrest.

* * * * *